US006977750B2

(12) United States Patent
Shiota et al.

(10) Patent No.: US 6,977,750 B2
(45) **Date of Patent: *Dec. 20, 2005**

(54) PICTURE PRINTING SYSTEM

(75) Inventors: Kazuo Shiota, Tokyo (JP); Norihisa Haneda, Saitama-ken (JP); Shigekazu Fukada, Tokyo (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 14 days.

This patent is subject to a terminal disclaimer.

(21) Appl. No.: 10/720,286

(22) Filed: Nov. 25, 2003

(65) Prior Publication Data

US 2004/0105103 A1 Jun. 3, 2004

Related U.S. Application Data

(62) Division of application No. 08/956,029, filed on Oct. 22, 1997, now Pat. No. 6,683,700.

(30) Foreign Application Priority Data

Oct. 22, 1996 (JP) .................................. 8-279206

(51) Int. Cl.[7] .............................................. G06F 15/00
(52) U.S. Cl. ....................................... 358/1.2; 358/448
(58) Field of Search .............................. 358/1.12, 1.16, 358/448, 1.6, 1.13, 1.15, 1.2

(56) References Cited

U.S. PATENT DOCUMENTS

| | | | | |
|---|---|---|---|---|
| 5,448,372 | A * | 9/1995 | Axman et al. | 386/124 |
| 5,619,738 | A * | 4/1997 | Petruchik et al. | 396/311 |
| 5,696,850 | A | 12/1997 | Parulski et al. | |
| 6,275,306 | B1 * | 8/2001 | Wataya et al. | 358/445 |
| 6,683,700 | B1 * | 1/2004 | Shiota et al. | 358/1.6 |

* cited by examiner

*Primary Examiner*—Mark Wallerson
(74) *Attorney, Agent, or Firm*—Birch, Stewart, Kolasch & Birch, LLP

(57) ABSTRACT

Using a picture image printing system, both types of pictures recorded by a camera using a film and a digital camera are effectively printed. The printing system comprises a film scanner for inputting a picture recorded on a film, and a card reader for inputting a picture recorded by a digital camera. By switching these upon necessity, digital image data are obtained. An image processing apparatus carries out a pixel number conversion on the digital image data keeping an aspect ratio of the image constant so that the picture image data are printed in a width almost the same as a width of rolled paper. The digital image data whose pixel number has been converted are printed in the form of a print on the rolled paper by a printer.

20 Claims, 2 Drawing Sheets

F I G.2
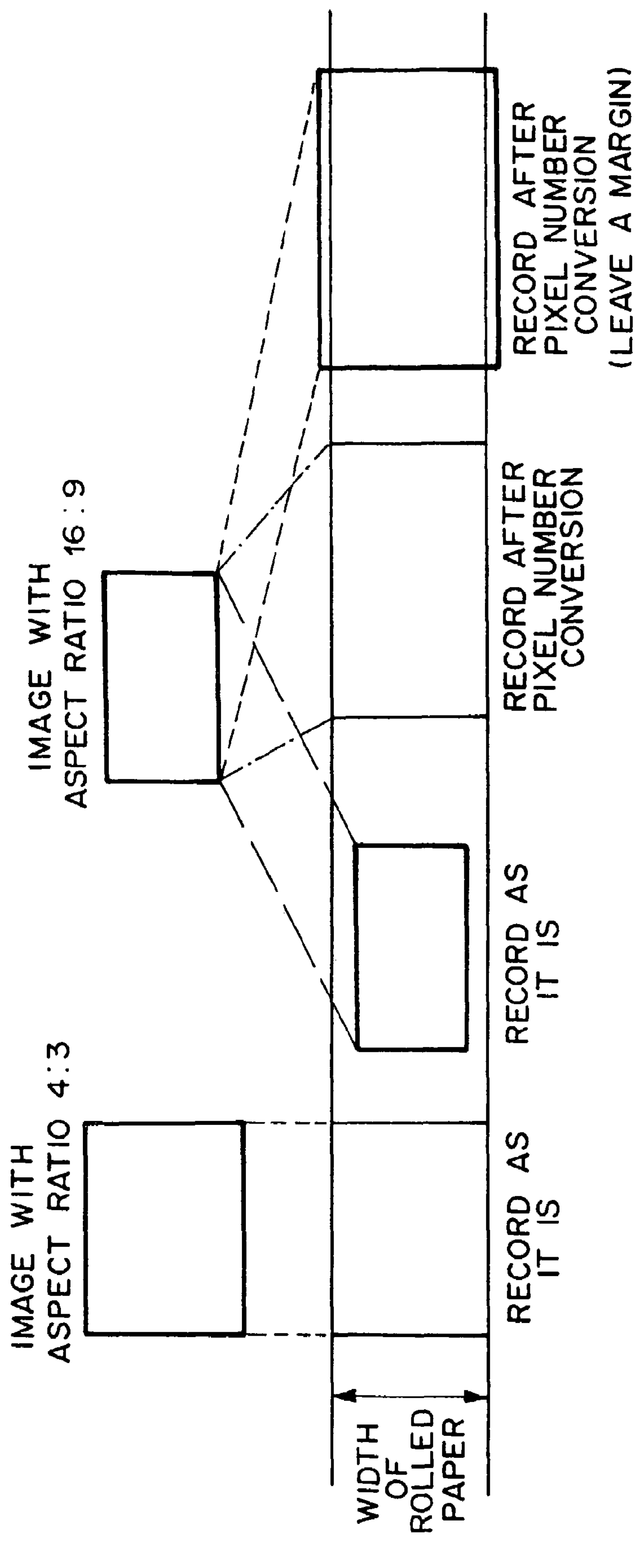

PICTURE PRINTING SYSTEM

This application is a Divisional of application Ser. No. 08/956,029, filed on Oct. 22, 1997, now U.S. Pat. No. 6,683,700 the entire contents of which are hereby incorporated by reference and for which priority is claimed under 35 U.S.C. §120; and this application claims priority of Application No. 279206/1996 filed in Japan on Oct. 22, 1996, under 35 U.S.C. §119.

BACKGROUND OF THE INVENTION

1. Field of the Invention

The present invention relates to a picture printing system. More specifically, the present invention relates to a printing system shared by a camera using a film and a digital camera, for printing pictures recorded by both types of cameras.

2. Description of the Related Art

A picture printing system has been known which obtains an image signal by reading a picture image recorded on a film with a film scanner, digitizes the obtained signal, and outputs the digital image data in the form of a picture print after image processing for correcting a color or tone is carried out on the digital image data.

On the other hand, a digital camera which records a picture image using an electronic image pickup device instead of a film is becoming widespread, and it is necessary for a picture image recorded by a digital camera to be output in the form of a print.

A picture recorded by a digital camera is normally displayed on a liquid crystal monitor attached to the digital camera, a TV screen, or a personal computer display, rather than output as a picture print. Therefore, an aspect ratio of the picture recorded by a digital camera is different from that of a picture recorded by a cameral using a film.

Some conventional picture printing systems as described above have a function for accepting digital image data input via a floppy disc or the like. However, this function is provided for temporarily storing a picture image read from a film in a floppy disc or the like, and for reproducing the image later. Therefore, this function cannot deal with the wide variety of aspect ratios of pictures recorded by a digital camera.

For this reason, when a picture recorded by a digital camera needs to be printed out using the digital unput function of the conventional picture printing system, an appropriate picture print cannot be obtained due to a large area being trimmed, for example.

One method of solving this problem is to provide an additional printing system for printing a picutre recorded by a digital camera. However, this method does not seem to be a practical solution due to problems regarding cost, a place to set the system in, and an operational flow, when a printing system for a picture recorded by a camera using a film already exists. Therefore, a picture printing system is desired which can print a picture recorded by a digital camera effectively in terms of time, space, and cost.

SUMMARY OF THE INVENTION

Based on the problems described above, an object of the present invention is to provide a picture printing system which can effectively print a picture recorded by either a digital camera or a camera using a film.

The picture printing system of the present invention is a picture printing system which records digital image data representing a picture image on rolled paper having a predetermined width, comprising image reading means for obtaining the digital image data by reading a picture image recorded on a film and/or in a picture print, data inputting means for inputting an image obtained by a digital camera as the digital image data, and pixel number converting means for carrying out a pixel number conversion on the digital image data input by either the image reading means or the data inputting means keeping an aspect ratio of the picture image constant so that either vertical or horizontal length of the picture image represented by the digital image data almost coincides with the predetermined width.

"Reading a picture image recorded on a film and/or in a picture print" herein means to read a picture image from a film using a transmission type scanner (a film scanner) or to read a picture image from a picture print using a reflection type scanner. In other words, the picture printing system of the present invention comprises either a film scanner or a reflection type scanner, or both, as "the image reading means".

"The data inputting means" is meant to include a conventional floppy disc drive or the like. More preferably, the data inputting means is a means which can most easily transfer data from a digital camera to the picture printing system. More specifically, if a digital camera uses a memory card, a card reader is equivalent to the data inputting means, while a cable connection interface or the like is equivalent to the means if a digital camera uses a built-in memory for storing an image. Practically, it is preferable to comprise a plurality of such inputting means so that a variety of cameras can be dealt with by the picture printing system of the present invention.

The image reading means and the data inputting means are used by switching from one to the other upon necessity. The switching may be carried out manually. However, it is preferable to automatically switch between the means in such a manner such that a film scanner is selected by detecting that a film is set in a scanner. This switching may not necessarily be carried out at each film or card memory, and can be carried out at each film frame or image data in a memory.

"Carrying out a pixel number conversion keeping an aspect ratio of the picture image constant so that either vertical or horizontal length of the picture image represented by the digital image data coincides with the predetermined width" means processing for matching a picture image size with the width of the rolled paper for avoiding a portion of the picture image not being printed because the picture image size exceeds the width of the rolled paper, or a large margin being left on the rolled paper because the picture image size is too small.

Therefore, the size of the picture image to be obtained by the pixel number conversion should only be the size satisfying the above condition, that is, the size which is "almost the same as the predetermined width", and does not need to be the size completely coinciding with the width of the rolled paper. In an actual picture printing system, occurrence of trimming caused by an error is sometimes avoided by setting the picture image size a little larger than the width of the rolled paper. The size "almost the same as the predetermined width" is meant to include the size in the case such as the above.

Generally, "an aspect ratio" is the ratio between vertical and horizontal lengths of an image. "Carrying out a pixel number conversion keeping an aspect ratio of the picture image constant" means that the pixel number conversion is carried out while an ratio of pixel numbers in the vertical and horizontal lengths in the digital image data representing a picture image is kept constant. In some cases, the aspect ratio may not be kept precisely constant, since the pixel numbers are integers. However, such a case is meant to be included in the present invention. In other words, an error is tolerated to some degree as long as distortion or trimming of the picture image does not cause visual discomfort.

For carrying out the pixel number conversion so that either the vertical or the horizontal length coincides with the width of the rolled paper, a function for setting an arbitrary magnification in response to the input picture image size is necessary. However, the number of pixels in the input digital image data often has some limit. Therefore, some predetermined magnifications of the pixel number conversion may be set in advance so that an operator can select a suitable magnification among them. Alternatively, information regarding the size may be added to image data as a portion of accompanying information so that a picture printer can calculate a magnification based on the information.

"Carrying out a pixel number conversion" is meant to include the case where the pixel numbers do not change as a result of the conversion, that is, the case where the conversion magnification factor is 1. As a method of pixel number conversion, any filtering and interpolation methods can be applicable. The conversion may be carried out as a single processing only to convert the pixel numbers. Alternatively, the conversion may be carried out together with processing for correcting a color or tone.

The picture printing system of the present invention comprises respective means for obtaining digital image data from a camera using a film and a digital camera. Means for carrying out image processing or outputting processing on the obtained digital image data and rolled paper on which the picture image is printed are common for both the digital camera and a camera using a film. Therefore, the picture printing system of the present invention can deal with pictures recorded by both a digital camera and a camera using a film, at a cost and a floor space almost equivalent to those for a conventional picture printing system dealing with a picture recorded by only a camera using a film. As a result, the picture printing processing for both pictures can be carried out effectively by switching the inputting means upon necessity.

In this case, the picture printing system carries out the pixel number conversion on the digital image data keeping the aspect ratio constant so that the digital image data will be printed in a width almost the same as the width of rolled paper on which the image data are going to be printed. Therefore, even when the aspect ratios of pictures recorded by a camera using a film and a digital camera are different, appropriate prints of the pictures will be obtained without a portion of the pictures being unprinted or trimmed.

BRIEF DESCRIPTION OF THE DRAWINGS

FIG. 2 is a view explaining a pixel number conversion.

DESCRIPTION OF THE PREFERRED EMBODIMENT

Figure 1:
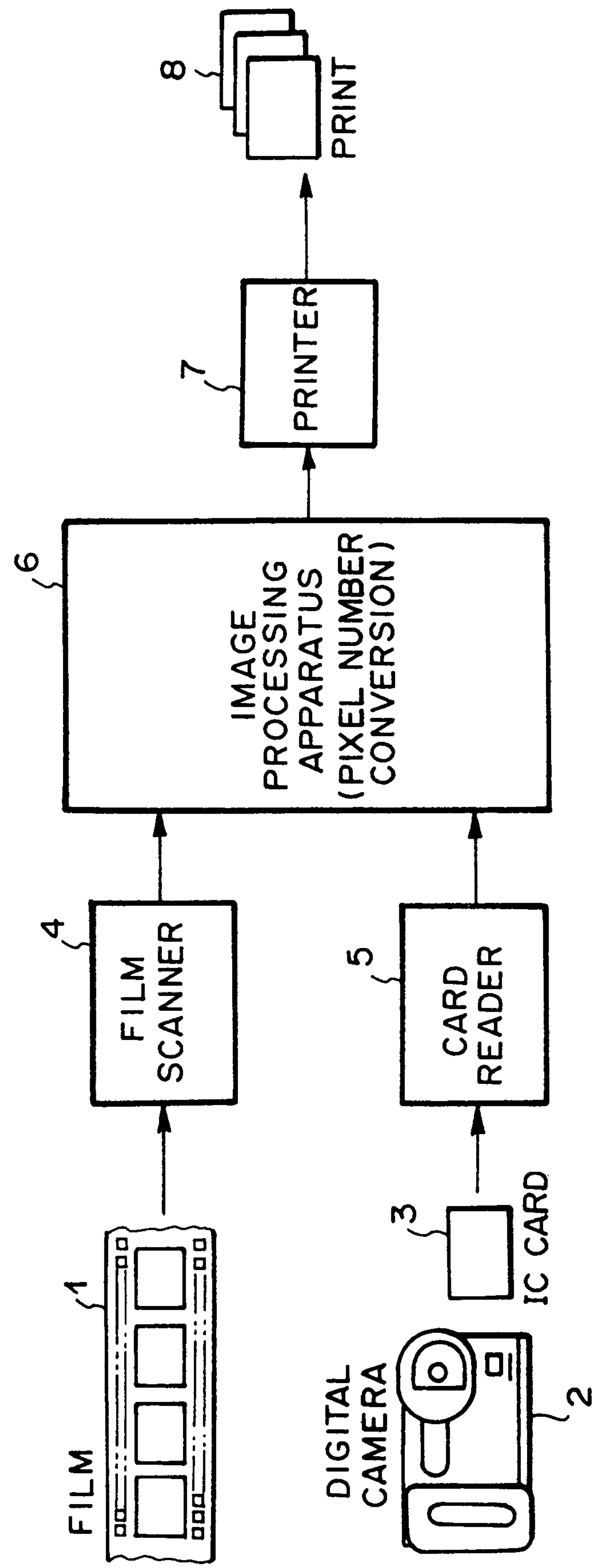
FIG. 1 is a view showing an embodiment of a picture printing system of the present invention.

Hereinafter, a picture printing system of the present invention will be explained referring to the accompanying drawings. FIG. 1 is a view showing an embodiment of the picture printing system of present invention. The picture printing system comprises a film scanner 4 for reading a picture image recorded on a film 1, a card reader 5 for reading an IC card 3 used as a memory of a digital camera 2, an image processing apparatus which carries out image processing such as a color tone correction as well as a pixel number conversion on digital image data input through the film scanner 4 and the card reader 5, and a printer 7 for outputting, in the form of a print 8, the digital image data which have been image processed by the image processing apparatus 6.

The image processing apparatus 6 obtains digital image data by selectively switching input between the film scanner 4 and the card reader 5. The switching may be carried out by directly controlling an input/output channel, or by temporarily storing input from each device in buffer memories and switching the buffer memories to be referred to. Any input/output switching method which has generally been known can be used as the switching method. The switching may be carried out manually by an operator at each film and card or at each image frame or image data. Alternatively, the switching may be carried out automatically by detecting that a film or a card is set in the scanner or the card reader respectively.

The aspect ratio of the obtained digital image is different between the images input from the film scanner 4 and the card reader 5. Moreover, even when images have been obtained by a digital camera, the aspect ratios thereof are different such that the ratio is 4:3 for an image which is assumed to be output to a screen of an ordinary TV set, and the ratio is 16:9 for an image which is assumed to be output to a screen of a high definition TV. For this reason, as shown by FIG. 2, when the images need to be printed on only one type of rolled paper, some images with certain aspect ratios can be recorded appropriately, while some portions of other images are unprinted or trimmed.

To avoid this phenomenon, the image processing apparatus 6 carries out the pixel number conversion-on digital image data as shown by FIG. 2 so that the picture image size appropriately fits the width of the rolled paper. At this time, either the vertical or the horizontal length may be adjusted to the width of the rolled paper, although it is generally better for the shorter length to be adjusted to the width. The pixel number conversion may be carried out so that an image is obtained whose one side is a little longer than the width of the rolled paper when an error caused by a slight displacement in rolled paper position or the like upon printing is taken into consideration.

As described above, the picture printing system of the present invention outputs a print after the image processing apparatus 6 carries out the pixel number conversion in accordance with the rolled paper width. Therefore, only one rolled paper needs to be set, and it is not necessary to exchange rolled paper in different widths so that the width of the paper fits the input image. Furthermore, a user or an operator of the printing system does not need to pay attention to a difference in the aspect ratio between picture images recorded by a camera using a film and a digital camera. The user or the operator only has to input a picture image to be printed via the inputting means. In this manner, an effective printing operation becomes possible.

The embodiment described above is merely an example in accordance with the present invention, and the inputting means of a picture image can be a reflection type scanner or a cable interface other than the film scanner and the card reader, for example. A plurality of inputting means for a camera using a film and for a digital camera may also be provided.

Any filtering and interpolation methods can be used for the pixel number conversion. The pixel number conversion may be carried out as a single process only to convert the pixel numbers, or it may be carried out together with the processing for correcting a color or tone.

What is claimed is:

1. An apparatus for recording digital image data representing a picture image on rolled paper having a predetermined width, comprising:

a data input connection for inputting at least one of film digital image data including digital image data representing a picture image obtained from a film camera and digital camera digital image data obtained by a digital camera;

a storage device storing said digital camera digital image data and said film digital image data; and a pixel number conversion device for performing pixel number conversion on the digital camera digital image data while maintaining a constant aspect ratio of the picture image so that the vertical or horizontal length of the picture image represented by the digital camera digital image data substantially coincides with the predetermined width.

2. The apparatus of claim 1, further comprising one of a film scanner, reflection type scanner, card reader, disc drive and said digital camera, connected to said data input connection.

3. The apparatus of claim 1, further comprising at least one additional data input connection for inputting digital camera digital image data obtained by a digital camera.

4. The apparatus of claim 3, further comprising at least one of card reader, disc drive or said digital camera, connected to said at least one additional data input connection for inputting said digital camera digital image data.

5. The apparatus of claim 1, wherein said pixel number conversion device performs a conversion magnification during the pixel number conversion in response to information regarding a size of the picture image, in the case that the digital camera digital image data includes information regarding the size as accompanying information.

6. The apparatus of claim 5, wherein said pixel number conversion device performs the pixel number conversion such that the vertical or horizontal length of the picture image is set to be slightly larger than the predetermined width.

7. An apparatus for recording digital image data representing a picture image on rolled paper having a predetermined width, comprising:

a storage device storing at least one of film digital image data including digital image data representing a picture image obtained from a film camera and digital camera digital image data obtained by a digital camera as said digital image data; and a pixel number conversion device for performing pixel number conversion on the digital camera digital image data while maintaining a constant aspect ratio of the picture image so that the vertical or horizontal length of the picture image represented by the digital camera digital image data substantially coincides with the predetermined width.

8. The apparatus of claim 7, wherein said pixel number conversion device performs the pixel number conversion such that the vertical or horizontal length of the picture image is set to be slightly larger than the predetermined width.

9. An apparatus for recording digital image data representing a picture image on rolled paper having a predetermined width, comprising:

a plurality of data input connections for inputting the digital image data; and a pixel number conversion device for performing pixel number conversion on the digital camera digital image data while maintaining a constant aspect ratio of the picture image so that the vertical or horizontal length of the picture image represented by the digital camera digital image data substantially coincides with the predetermined width.

10. The apparatus of claim 9, further comprising at least one of card reader, disc drive or digital camera, connected to at least one of said data input connections for inputting said digital image data.

11. The apparatus of claim 10, further comprising at least one of film scanner and reflection scanner, connected to at least one of said data input connections for inputting digital image data representing a picture image obtained from a film camera.

12. A picture printing system for recording digital image data representing a picture image on rolled paper having a predetermined width, comprising:

a plurality of data input devices for inputting the digital image data; and a pixel number conversion device for performing pixel number conversion on the digital image data inputted by the data inputting devices while maintaining a constant aspect ratio of the picture image so that the vertical or horizontal length of the picture image represented by the digital image data substantially coincides with the predetermined width.

13. The picture printing system of claim 12, wherein at least one of said data input devices is a digital camera.

14. The picture printing system of claim 12, wherein at least one of said data input devices includes an image reading device for obtaining the digital image data by reading picture image recorded on a film and/or in a picture print.

15. The picture printing system of claim 12, wherein said pixel number conversion device performs a conversion magnification during the pixel number conversion in response to information regarding a size of the picture image, in the case that the digital image data includes information regarding the size as accompanying information.

16. The picture printing system of claim 15, wherein said pixel number conversion device performs the pixel number conversion such that the vertical or horizontal length of the picture image is set to be slightly larger than the predetermined width.

17. A picture printing method for recording digital image data representing a picture image on rolled paper having a predetermined width, comprising:

inputting the digital image data; and performing pixel number conversion on the inputted digital image data while maintaining a constant aspect ratio of the picture image so that the vertical or horizontal length of the picture image represented by the digital image data substantially coincides with the predetermined width.

18. The picture printing method of claim 17, wherein said inputting step includes obtaining the digital image data by reading picture image recorded on a film and/or in a picture print.

19. The picture printing method of claim 17, wherein said step of performing pixel number conversion comprises setting a conversion magnification during the pixel number conversion in response to information regarding a size of the picture image, in the case that the digital image data includes information regarding the size as accompanying information.

20. The picture printing method of claim 19, wherein said step of performing pixel number conversion is performed such that the vertical or horizontal length of the picture image is set to be slightly larger than the predetermined width.

* * * * *